April 20, 1937.  S. SMITH  2,078,034
VEHICLE
Filed April 24, 1936    9 Sheets-Sheet 1

INVENTOR:
SYDNEY SMITH
ATTORNEYS

April 20, 1937.  S. SMITH  2,078,034
VEHICLE
Filed April 24, 1936  9 Sheets-Sheet 5

FIG.5.

INVENTOR:
SYDNEY SMITH
BY: Ruege & Bryce.
ATTORNEYS

April 20, 1937. S. SMITH 2,078,034
VEHICLE
Filed April 24, 1936 9 Sheets-Sheet 6

FIG. 6.

INVENTOR:
SYDNEY SMITH
BY: Kruege & Boyee
ATTORNEYS

April 20, 1937.　　　　　S. SMITH　　　　　2,078,034
VEHICLE
Filed April 24, 1936　　　9 Sheets-Sheet 8

FIG. 10

INVENTOR:
SYDNEY SMITH
BY: Reese & Boyce
ATTORNEYS

Patented Apr. 20, 1937

2,078,034

UNITED STATES PATENT OFFICE 2,078,034

VEHICLE

Sydney Smith, Chobham, England

Application April 24, 1936, Serial No. 76,152
In Great Britain January 18, 1935

9 Claims. (Cl. 180—43)

This invention relates to improvements in vehicles, and particularly concerns drive means therefor of the kind including an engine or driving unit, coupled or geared to speed reduction or change speed gearing mounted immediately below or in or at the base of said engine or driving unit, and a transmission shaft or transmission shafts driven by or from said gearing and adapted to transmit the drive to the driving wheel or wheels of the vehicle.

The object of the invention is to provide generally improved drive means of this kind.

Referring to the drawings:—

In Figures 1 to 6 of the accompanying drawings the invention is shown as applied to an automobile vehicle of the front wheel drive type and the engine or driving unit is of the usual internal combustion type and comprises a cylinder block 7 in the cylinders of which are mounted pistons 8 connected by connecting rods 9 to a crankshaft 10 supported in bearings 11, 12 and 13 provided in the cylinder block.

To the rear end of the crankshaft projecting through the bearing 13 is secured a flywheel 14 with which is associated a clutch 15.

The clutch plate 16 has a splined connection at 17 to a sleeve 18 rotatable mounted upon the crankshaft.

The rear end of the crankshaft engages in a bearing 19 in a cover 20 secured to the rear end of the cylinder block and the clutch operating mechanism includes a sleeve 21 slidably mounted upon the boss 22 in which is mounted the bearing 19. Upon the sleeve 21 is mounted a ball bearing 23 supporting an outer annulus 24 adapted to operate the clutch withdrawal levers 25.

The clutch operating lever or member is pivoted at 26 to the cover 20 and is provided with a follower or crank 27 adapted to engage a projection 28 on the sleeve 21 to move the latter upon the boss 22 to release the clutch. The usual springs 29 are provided for engaging the clutch when the withdrawal mechanism is released.

The sleeve 18 is connected by chain gearing to change speed gearing mounted in the base of the cylinder block near the rear end thereof and the sleeve 18 is formed or provided with teeth 30 for engagement with the chain 31 meshing with further teeth on the wheel 32 on the shaft 33 supported in bearings 34 carried by the cylinder block.

On the shaft 33 is mounted the constant mesh wheel 35 gearing with the wheel 36 on the counter-shaft 37 supported in bearings 38. Upon the counter-shaft 37 are mounted further gears 39 and 40 for meshing engagement respectively with gears 41 and 42 mounted slidably but non-rotatably on the splined shaft 44.

The rearward end of the shaft 44 is reduced in diameter and engages within a bearing in the forward end of the shaft 33, whilst the forward end of the shaft 44 is supported in further bearings 45 in transverse webs in the outer casing.

The gear 41 can be slidden axially upon the shaft 44 by means of a selector lever 46 and can be engaged either with the wheel 39 for a lower gear forward drive or with a reverse pinion 47 to provide a reverse drive.

The gear 42 can be slidden upon the shaft 44 by means of a further selector lever 48 and movement in one direction engages the gear 42 with the gear 40, whilst movement in the opposite direction engages the direct drive teeth 49 with teeth 50 on the constant mesh wheel 35.

Each lever 46 and 48 is provided with a boss 51 slidably mounted on a rod 52 supported in the outer casing and the levers are selectively operated by means of an arm 53 on a selector rod 54 which can be moved axially and also rotated upon its axis in bearings in the casing.

On the forward end of the shaft 44 is mounted a bevel pinion 55 gearing with a ring bevel 56 adapted to drive a pair of transmission shafts 57 through differential gearing mounted at 58.

Each shaft 57 transmits the drive to one of the front road wheels 59 through universal joints 60 and each shaft extends through and is enclosed by a hollow housing 61 bolted or otherwise secured to the side of the casing of the unit.

Oil retaining devices 83 are provided for the bearings 84 to prevent oil leaking from the differential casing to the universal joints.

Each housing 61 is forked at its projecting end to provide a pair of spaced arms 62 in which are supported substantially vertical king pins 63. Helically coiled springs 64 are provided on the pins 63 above and below the arms 62 to provide independent springing for each wheel and to permit movement of the wheels relative to the housings 61.

The drive means according to this invention are combined with a front wheel drive unit of the kind covered by my U. S. patent application serially numbered 693,290, now Patent No. 2,049,474, the engine being mounted between a pair of arms 65 each engaged at its rear end with the body of the vehicle through a flexible or resilient connection 66 permitting relative movement between the front wheel unit and the body about an axis extending transversely across the latter.

Figure 2:
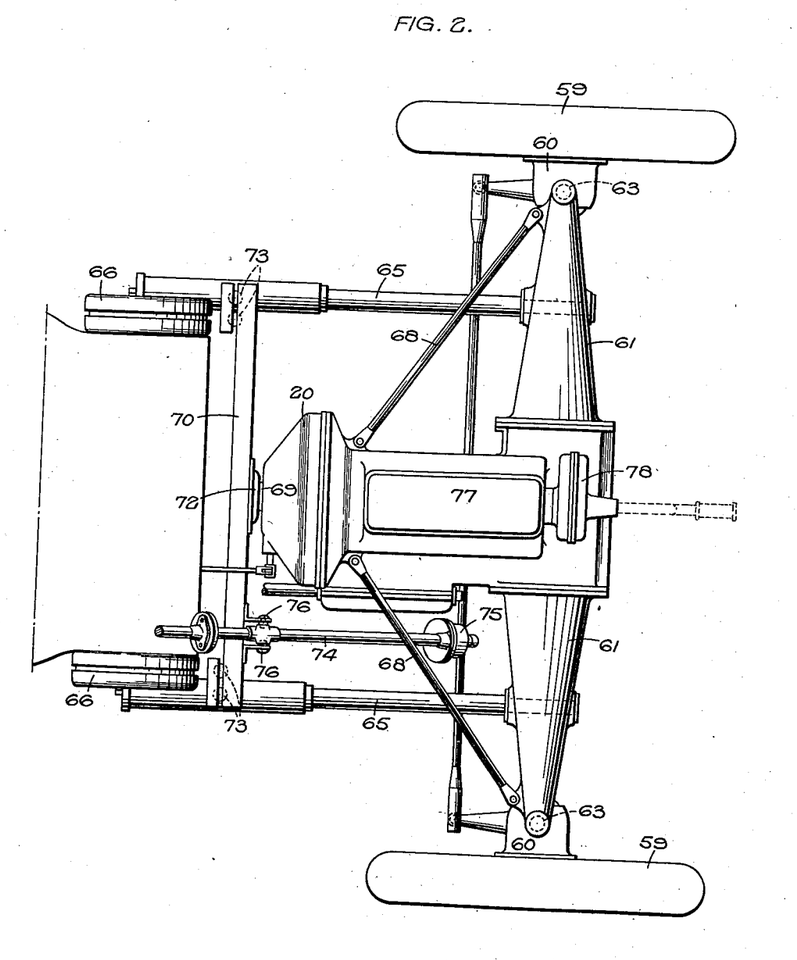
Figure 2 is a plan view of the same.
Figure 3:
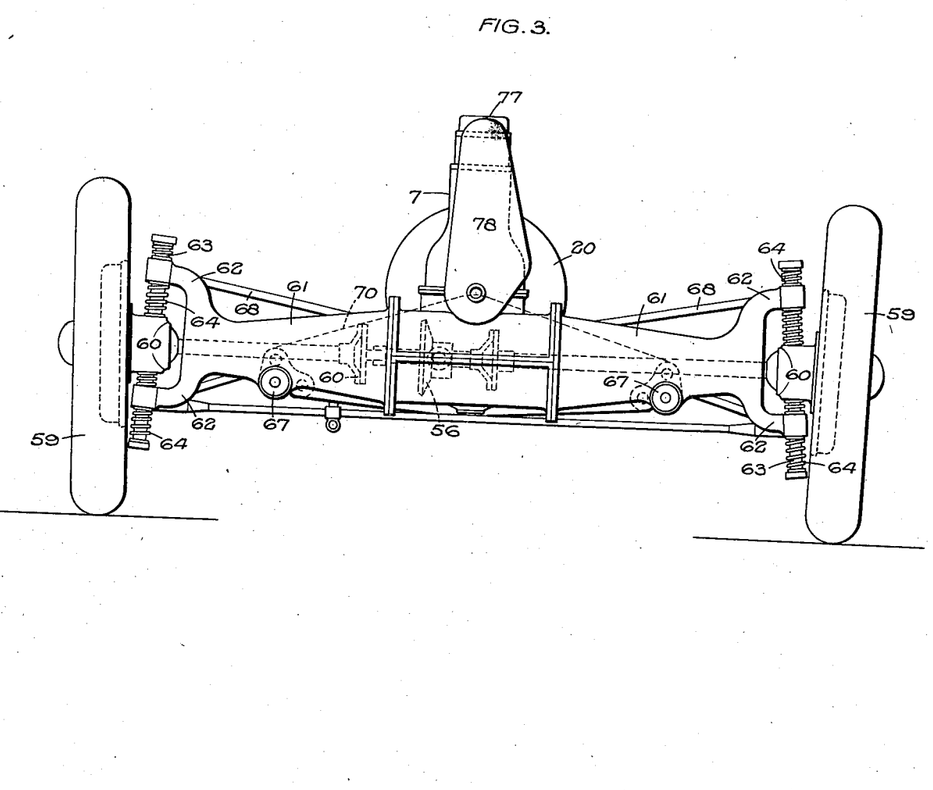
Figure 3 shows the same in front elevation.
Figure 4:
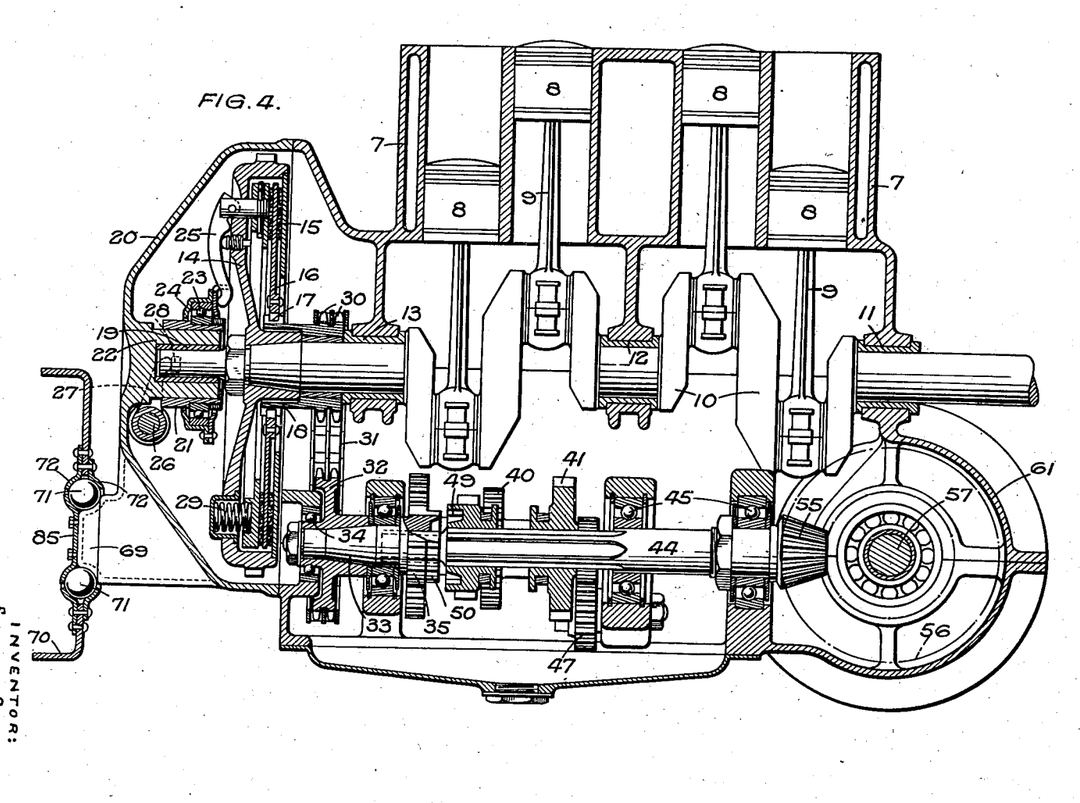
Figure 4 is a longitudinal section through the drive unit.
Figure 5:
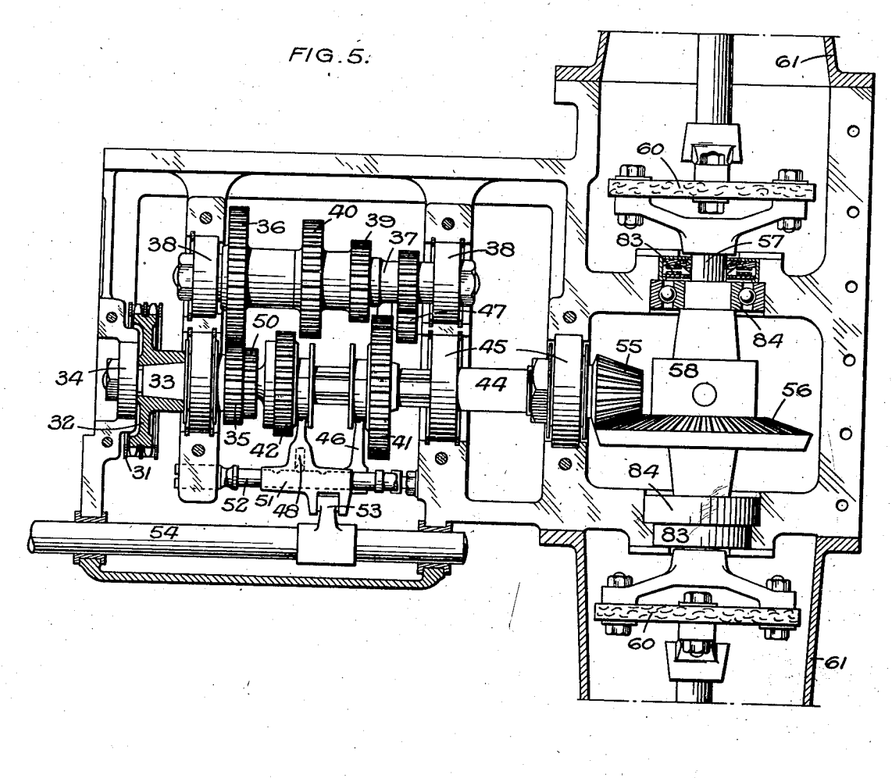
Figure 5 is a sectional plan view of same.
Figure 6:
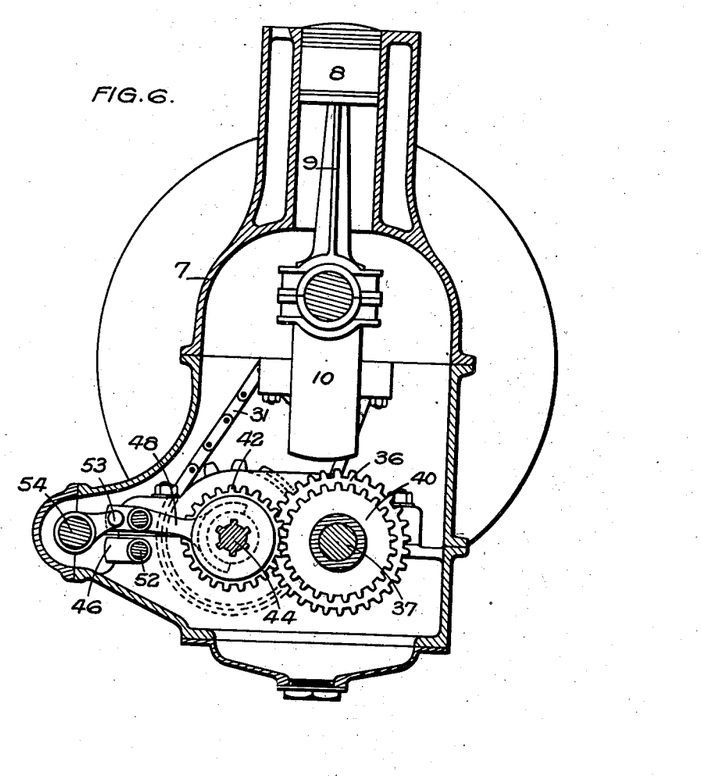
Figure 6 is a sectional end elevation.
Figure 9:
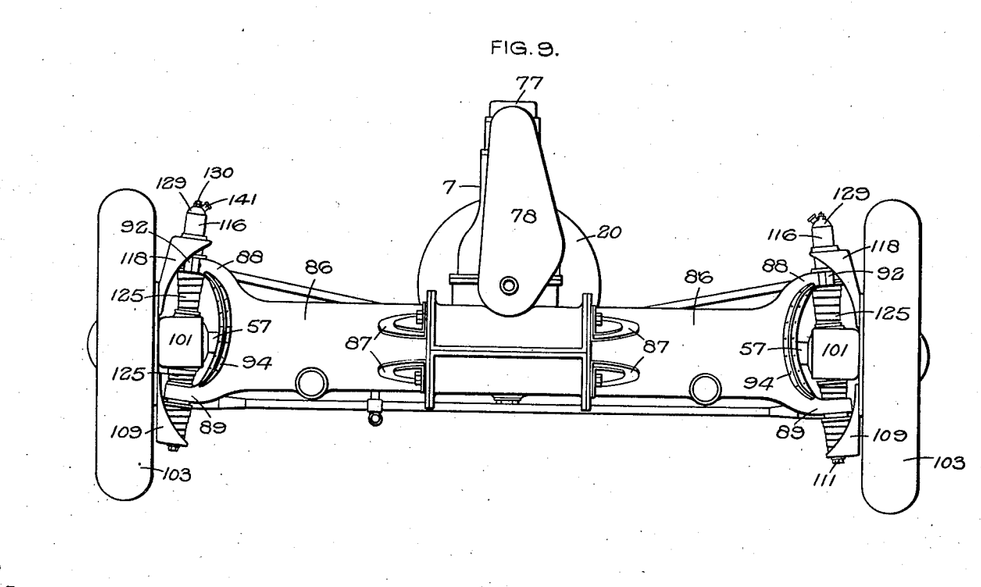
Figure 9 is a front elevation of a modified construction.

Each arm 65 extends through rubber bushes 67 in bosses on the corresponding housing 61 and each housing is tied to the casing of the engine by a pair of rearwardly inclined tie rods 68 as shown in Figure 2.

Figures 1, 7, 8:
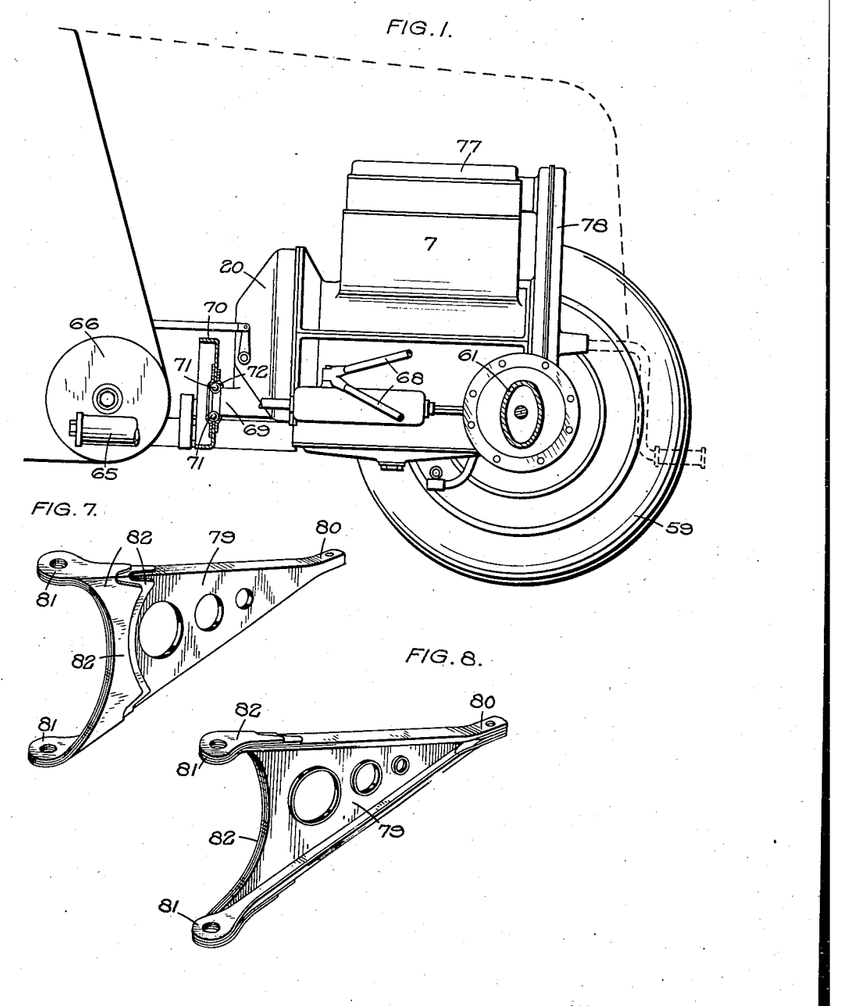
Figure 1 is a side elevation of the front of an automobile vehicle incorporating drive means according to this invention.
Figures 7 and 8 are perspective views of a modified stay member.

In Figures 7 and 8 is illustrated an alternative form of stay for use in place of the tie rods 68, this stay comprising a sheet metal pressing 79 adapted at the end 80 for attachment to the engine casing and forked at the other end 81 for connection to the housing 61. The pressing is strengthened at this end 81 by means of sheet metal members 82 which distribute the stress applied to the stay.

On the cover 20 at the rear end of the engine casing is a rearwardly projected pivot 69 which engages in a flexible bearing or support on a bar or member 70 connected between the wheel arms 65. The engine is thus mounted upon a triangulated support comprising the pivot 69 at the rear end and the two housings 61 secured one to each side of the outer casing near the front end thereof.

The bearing for the pivot 69 comprises a ring or race of balls 71 of rubber or other resilient material mounted within race members 72 riveted or bolted to the member 70, a further race being provided on a plate 85 bolted to the pivot 69. The member 70 is flexibly mounted between the arms 65 upon further rubber or resilient balls 73 mounted between part spherical cups or recesses in the ends of the member 70 and in the flanges on the arms 65.

If desired a continuous ring of rubber or other resilient material may be substituted for the balls 71.

The steering column 74 extending from the steering box 75 is supported from the member 70 upon further rubber balls 76 mounted between part-spherical cups or recesses in a member on the column and in brackets secured to the member 70.

The valve gear for the engine is mounted in a casing 77 secured to the top of the cylinder block and this mechanism is operated by a chain drive in a casing 78 and driven from the front end of the crankshaft.

In the modified arrangement illustrated in Figures 9 to 12, the engine, gear box and transmission to the shafts 57 are as described with reference to Figures 1 to 6 and the modifications concern the housings for the shafts 57 and the combined steering, driving and spring mounting for the front road wheels.

Each housing 86 is formed from sheet metal and at the end to be bolted to the casing for the differential gear this housing is flanged and provided with strengthening members 87 of successively reduced area. These members 87 strengthen and stiffen the housing 86 at the point at which it is attached to the casing for the driving unit and the stepped arrangement has the effect of distributing in a gradual manner to the casing any stress applied at such points.

Figure 10:
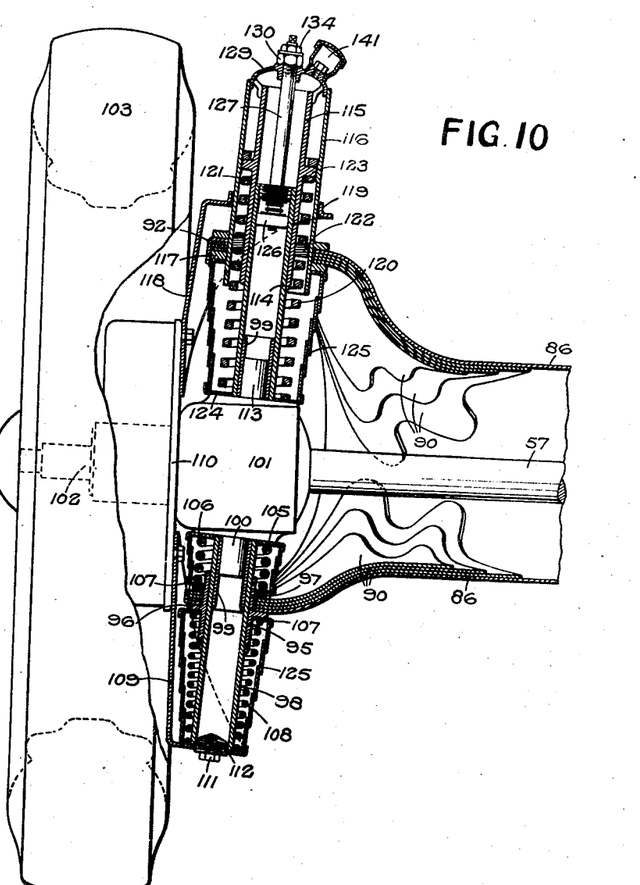
Figure 10 shows in section the construction of the combined steering, driving and spring mounting for the front wheel axle of same.
Figure 11:
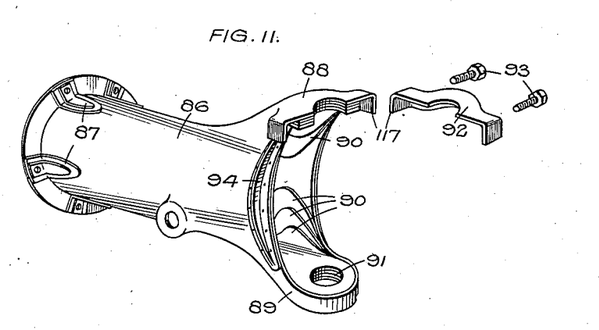
Figure 11 is a perspective view of one axle housing.
Figure 12:
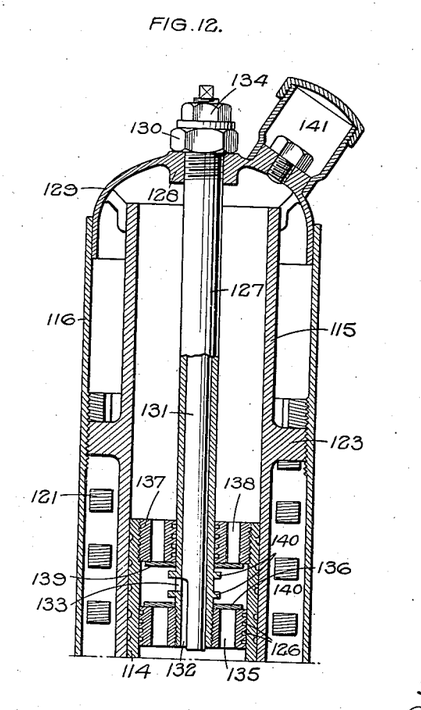
Figure 12 shows to an enlarged scale a detail of the steering, driving and spring mounting.

Each housing 86 is forked at its outer or projecting end and both the upper arm 88 and lower arm 89 of this fork are stiffened by internal sheet metal members 90 shaped with a sinuous outer edge as shown in Figure 10 and of successively graduated area so as to distribute any stress in a gradual manner to the housing.

A hole 91 is formed through the end of the lower arm 89 and through the sheet metal members 90 secured in such arm, but the upper arm 88 is provided with an end cap 92 adapted to be secured detachably by bolts 93 to the end of the arm to facilitate assembly. The housing is additionally stiffened by sheet metal members 94 of substantially T section and secured one at each side of the fork between the arms 88 and 89. The sheet metal members 87, 90 and 94 may be secured to the housing either by riveting, spot welding or in any other convenient manner.

Within the hole 91 is inserted a tube 95 having a flange 96 which abuts the underside of the arm 89 and this tube is secured in position by a ring nut 97 internally threaded and engaging an externally threaded portion of the tube 95.

Slidably mounted within the tube 95 is a tube 98 within which is mounted a further and shorter tube 99 and these tubes 98 and 99 are adapted to be secured to a projecting spigot 100 provided on the underside of the member 101 carrying the stub axle 102 for the front wheel 103.

A coiled spring 105 is provided around the tube 98 between a washer 106 at the underside of the member 101 and a further washer 107 above the screwed ring 97 and a further spring 108 is disposed around the lower end of the tube 98 between a further washer 107 on the underside of the flange 96 and the flange of a bracket 109 bolted to the plate 110 carrying the brake mechanism.

This bracket is anchored to the lower end of the tube 98 by means of a stud 111 engaging in a nut 112 welded within the end of the tube 98.

The member 101 is provided on its upper surface with a further spigot 113 which engages in a tube 99 within a further tube 114 arranged in a manner similar to the tubes 99 and 98 on the underside of the member 101.

The spigots 100 and 113 fit within the respective tubes 99 and are secured thereto in a convenient manner.

The tube 114 engages slidably in a tube 115 secured in an outer tubular casing 116, which latter is located in relation to the upper arm 88 of the housing 86 by means of spaced flanges 117 suitably secured to the tubular casing.

The casing 116 is additionally stayed by a bracket 118 similar to the bracket 109 and bolted to the plate 110, this bracket 118 having a flanged opening 119 through which is slidable the outer casing 116.

Two coiled springs are disposed around the tube 114 and within the tubular casing 116, these springs 120 and 121 being separated by an annular member 122 which fits slidably in the annular space between the tube 115 and the interior of the tubular casing 116.

The spring 121 abuts at its upper end against an abutment flange 123, whilst the lower end of the spring 120 rests upon a washer 124 on the upper side of the member 101.

The springs or the exposed portions thereof are enclosed by casing members 125 formed by coiling spring metal strip in such a manner that the turns or coils can collapse or telescope one into the other to permit movement of the spring, whilst at the same time protecting the latter from dirt or other material.

Within the tubular casing 116 is mounted a shock absorbing unit comprising a piston 126 fixed to the lower end of a tube 127 which is screwed at its upper end in a boss 128 in the cap 129 for the casing 116, this tube being fixed in position by a locking nut 130.

Within the tube 127 is a rod 131 having at its lower end a longitudinal groove or passage 132 which can be aligned with a port 133 in the tube 127, the rod being locked in an adjusted position by a nut 134.

The piston 126 has holes or passages 135 adapted to be closed by a disc valve 136 and oil or other suitable fluid is provided within the tubes 114 and 115 so that the piston operates as a hydraulic shock absorber during movements of the wheel and the spring mounting including the member 101 and the tubes 98 and 114.

Into the upper end of the tube 114 is screwed a closure disc 137 also provided with holes 138 adapted to be closed by a further disc valve 139 and movement of these valves 136 and 139 is limited by collars 140 fixed to the exterior of the tube 127.

When the wheel and the member 101 carrying the stub axle rises in relation to the end of the housing 86 as, for example, when the wheel passes over an obstruction, the tubes 98 and 114 also move with the wheel and the fluid in the tube 114 is forced through the passages 135 and past the valve 136.

On downward or return movement of the wheel the valve 136 is closed and the rate at which the wheel can return is governed by the rate at which the fluid can leak to the underside of the piston 135 through the port 133 and the passage 132.

Thus, the rate of rebound of the wheel can be governed by adjusting the rod 131 relative to the tube 127 so as to move the passage 132 more or less into alignment with the port 133 and the damping or shock absorbing effect can thus be regulated by suitable adjustment of the rod 131.

Rapid fluctuations of the wheel are damped out by trapping of fluid between the piston and the closure disc 137 and whilst the valve 139 can open to allow fluid to pass to the upper surface of the piston when pressure is removed from the valve 139, the latter prevents free flow of fluid through the passages 138 and into the tube 115 when the tube 114 moves downwardly relative to the piston 126.

The interior of the tube 115 forms a reserve compartment for the fluid and is supplied through an inlet 141 but no substantial pressure is applied to the fluid within this tube due to the action of the valve 139 for the closure member 137.

The piston and the tube 114 are provided with external peripheral grooves and similar grooves are formed on the interior of the bore through the closure member 137 so as to minimize the leakage of fluid.

The combined steering, driving and spring mounting for each front road wheel as above described provides an extremely effective but compact unit for attaching the front road wheels to the housings 86 and the construction has adequate strength due to the spaced supports provided by the brackets 109 and 118 and the attachment between the arms 88 and 89 of the housing and the tubes carried by the member 101 carrying the stub axle.

The springs permit adequate movement of the road wheels relative to the housings 86 but are nevertheless disposed in an effective and compact manner, whilst the incorporation of the shock absorbing unit is advantageous both from a point of view of operation and of providing a compact and relatively light arrangement.

The casing for the gearing thus occupies the position normally occupied by the oil sump of an ordinary internal combustion engine, and is enclosed on its underside to form a sump for the engine oil.

With internal combustion engines for motor vehicles, it has hitherto been usual to provide different types of lubricating oil in the engine sump and in the casing for the reduction or change speed gearing, but the developments which have taken place in recent years in the production of lubricating oil have rendered it possible for a single type of oil to be used both in the engine sump and in the gear casing.

In the construction according to this invention, oil provided in the casing for the gearing serves for the lubrication both of the gearing and of the engine cylinders.

Instead of connecting the crankshaft to the variable speed gearing by means of a chain connecting drive, gears may be used for this purpose, and if desired, such gears may be of spiral bevel, double helical, or worm and worm wheel type to reduce the noise of the drive.

The ring bevel is positioned off centre in relation to the transverse centre line of the engine, and whilst this does not affect the operation of the drive, it does permit the transmission shaft being approached as closely as possible to the rotational axis of the crankshaft to provide an engine or drive unit of minimum possible effective height.

If desired, the final drive to the transmission shaft may comprise a worm and worm wheel, the latter being secured to the transmission shaft, and the worm being mounted on the end of the gearing. In this alternative, the worm wheel gearing may be disposed in a position similar to that described above for the ring bevel.

The construction described above is particularly desirable as drive means for a vehicle driving to the front wheels, or in cars with the engine at the rear, since the engine is compact, and substantially the whole of the weight is located in or adjacent the axles for the wheels. It is thus possible to provide substantially the whole of the weight of the engine over the front wheels in front wheel drive as is desirable to ensure an efficient drive and adequate steerageway for the vehicle, whereas in a rear engine drive there is less space wasted or less overhang.

With the transmission shaft arranged at the front of the engine casing the weight of the drive unit is nearly all disposed substantially above the drive shafts to the front wheels, but the centre of gravity of the drive unit is disposed behind the axis of the drive shafts.

If desired, however, the arrangement may be reversed by mounting the transmission shaft at the rear of the engine for connection to the rear of the reduction or other gearing, and in this construction the centre of gravity of the drive unit as a whole would be disposed in front of the axis of the drive shafts, and the maximum possible weight would be disposed over the drive axis to the front wheels, this being advantageous especially in commercial vehicles.

Whilst the invention is particularly applicable to a vehicle driving to the front wheels, it will be appreciated that it may be applied to a vehicle driving to the rear wheels, the engine and drive unit being then arranged at the rear of the vehicle with its centre of gravity either behind or in front of the axis of the drive shafts to the wheels, as will be obvious from the immediately preceding paragraphs relating to the arrangement of the centre of gravity of the engine relative to the driving axis.

The drive to the change speed gearing is preferably such that at the side directed towards the engine, the gears on the shafts 37 and 44 rotate in such a manner that any metal from the engine bearings or other foreign material falling onto them is moved out of the throat between the two sets of gears, i. e. when the shafts 37 and 44 are rotating the teeth of the gears on each shaft move in the path of rotation outwardly of the plane between the two shafts and away from the teeth of the gears on the adjacent shaft.

On the opposite or underside of the gearing the teeth of the gears move in converging paths and thus operate to move oil directly from the sump and between the intermeshing teeth of the change speed gears.

The construction according to the present invention provides a self-contained drive unit of minimum possible effective length, since the reduction or change speed gearing and the transmission shaft or shafts are arranged all substantially within the length of the engine or cylinder block, and the unit construction described above permits an extremely rigid and efficient drive to be incorporated with the elimination of unnecessary weight.

A singe oil pump may be incorporated in the drive unit and driven therefrom to feed oil to the engine, the gear box, and the driving axle from the oil sump referred to above.

When viewed from the front or back, the vertical plane containing the centre line of the crankshaft is disposed substantially centrally of the engine block and the constant mesh shaft of the reduction gearing is mounted with its axis at one side of this plane, whilst the other shaft of the reduction gearing is arranged with its axis on the opposite side of the said plane.

The change gearing may be of any other suitable form with gear trains to provide any desired speed ratios and may be operated by any convenient control or gear operating mechanism.

What I claim then is:—

1. Vehicle drive means including a driving unit, a casing for said unit, change speed gearing mounted in the lower portion of said casing, means coupling said gearing to said unit, a pair of transmission shaft housings mounted on opposite sides of said casing, transmission shafting extending in said housings, means for driving said shafting from said change speed gearing, a wheel mounting at the projecting end of each housing, a road wheel carried by each of said mountings, means for driving said wheel from said shafting, each of said housings being forked at its projecting end, spring means permitting movement of each of said wheel mountings relative to its associated housing, said spring means incorporating, for each of said mountings, substantially vertically disposed guides supported in the forked end of said housing, springs associated with said guides and acting between said mounting and said housing and a shock absorbing device for each of said mountings and incorporated with said guides.

2. In a vehicle including a body, the provision of drive means including a driving unit, a casing for said unit, change speed gearing mounted in the lower portion of said casing adjacent one end thereof, gearing connecting said change speed gearing to said driving unit, a pair of transmission shaft housings rigidly mounted on opposite sides of said casing adjacent the other end thereof, a pair of transmission shafts extending one in each of said housings, transmission gearing connecting said shafts to said change speed gearing, combined steering, driving and suspension means on the projecting end of each housing for mounting on said housing a vehicle road wheel driven from said transmission shaft, a pair of arms extending longitudinally one at each side of said driving unit, each arm being connected at its forward end to one of said housings, means for supporting, from said arms, the end of said casing opposite to that at which said housings are mounted and means for connecting each of said arms at its rearward end resiliently to said body.

3. In a vehicle including a body, the provision of drive means including a driving unit, a casing for said unit, change speed gearing mounted in the lower portion of said casing adjacent one end thereof, gearing connecting said change speed gearing to said driving unit, a pair of transmission shaft housings rigidly mounted on opposite sides of said casing adjacent the forward end thereof, a pair of transmission shafts extending one in each of said housings, transmission gearing connecting said shafts to said change speed gearing, combined steering, driving and suspension means on the projecting end of each housing for mounting on said housing a vehicle road wheel driven from said transmission shaft, a pair of arms extending longitudinally one at each side of said driving unit, each arm being connected at its forward end to one of said housings, a pivot on the rearward end of said casing, a bearing carried between said arms, said pivot engaging in said bearing to support the rear end of said casing from said arms and means for connecting each of said arms at its rearward end resiliently to said body.

4. In a vehicle including a body, the provision of drive means including a driving unit, a casing for said unit, change speed gearing mounted in the lower portion of said casing adjacent one end thereof, gearing connecting said change speed gearing to said driving unit, a pair of transmission shaft housings rigidly mounted on opposite sides of said casing adjacent the forward end thereof, a pair of transmission shafts extending one in each of said housings, transmission gearing connecting said shafts to said change speed gearing, combined steering, driving and suspension means mounted on the projecting end of each housing for mounting on said housing a vehicle road wheel driven from the transmission shaft in said housing, a pair of arms extending longitudinally one at each side of said driving unit, each arm being connected at its forward end to one of said housings, a pivot on the rearward end of said casing, a member supported by said arms and extending transversely at the rear of said casing, a bearing carried by said member, said pivot engaging in said bearing to support the rear end of said casing from said arms and means for connecting each of said arms at its rearward end resiliently to said body.

5. Vehicle drive means including a driving unit, a casing for said unit, change speed gearing mounted in the lower portion of said casing adjacent one end thereof, gearing connecting said change speed gearing to said driving unit, a pair of transmission shaft housings rigidly mounted on opposite sides of said casing adjacent the forward end thereof, a pair of transmission shafts extending one in each of said housings, transmission gearing connecting said shafts to said change speed gearing, spring suspension means mounted at the projecting end of each housing for mounting on said housing a vehicle road wheel driven from the transmission shaft in said housing, a pair of arms extending longitudinally one at each side of said driving unit, each arm being connected at its forward end to one of said housings, a pivot on the rearward end of said casing, a bearing carried between said arms, said pivot engaging in said bearing to support the rear end of said casing from said arms and resilient connecting means between each of said arms and the body of the vehicle.

6. Vehicle drive means including a driving unit, a casing for said unit, change speed gearing mounted in the lower portion of said casing adjacent one end thereof, gearing connecting said change speed gearing to said driving unit, a pair of transmission shaft housings rigidly mounted on opposite sides of said casing adjacent the forward end thereof, a pair of transmission shafts extending one in each of said housings, transmission gearing connecting said shafts to said change speed gearing, combined steering, driving and suspension means on the projecting end of each housing for mounting on said housing a vehicle road wheel driven from the transmission shaft in said housing, a pair of arms extending longitudinally one at each side of said driving unit, each arm being connected at its forward end to one of said housings, a pivot on the rearward end of said casing, a member supported by said arms and extending transversely at the rear of said casing, a bearing carried by said member, said pivot engaging in said bearing to support the rear end of said casing from said arms and resilient connecting means between each of said arms and the body of the vehicle.

7. In a vehicle the provision of drive means including a driving unit, a casing for said unit, change speed gearing mounted in the lower portion of said casing, means coupling said gearing to said unit, a pair of transmission shaft housings rigidly secured one to each of two opposite sides of said casing, a pair of transmission shafts extending one in each of said housings, means for driving said shafts from said change speed gearing, a wheel mounting at the projecting end of each of said shafts, a road wheel on each of said mountings and adapted to be driven by said shaft, guides at the projecting end of each of said housings permitting substantially vertical relative movement between the latter and the mounting associated therewith, springs co-operating with said guides and acting between each of said mountings and the end of the associated housing, and a shock absorbing device for each of said mountings and incorporated with said guides.

8. In a vehicle the provision of drive means including a driving unit, a casing for said unit, change speed gearing mounted in the lower portion of said casing, means coupling said gearing to said unit, a pair of transmission shaft housings rigidly secured one to each of two opposite sides of said casing, each of said housings being forked at its projecting end, a pair of transmission shafts extending one on each of said housings, means for driving said shafts from said change speed gearing, a combined steering, driving and suspension at the projecting end of each of said shafts, a road wheel on each of said mountings and adapted to be driven by said shaft, spring means permitting substantially vertical movement of each of said mountings relative to its associated housing, said spring means incorporating for each of said mountings, substantially vertically disposed guides supported in the forked end of said housings, springs associated with said guides and acting between said mounting and said housing and a shock absorbing device for each of said mountings and incorporated with said guides.

9. Vehicle drive means including a driving unit, change speed gearing mounted below said driving unit, means coupling said change speed gearing to said driving unit, a casing for said driving unit, a pair of sheet metal transmissioin shaft housings secured one to each side of said casing, suspension means at the projecting end of each housing, a road wheel at the end of each housing and associated with said means, a plurality of reinforcing plates secured to each housing for reinforcing the end portion of said housing carrying said road wheel suspension means, said reinforcement plates being of different dimensions and arranged stepwise one upon the other to distribute the reinforcement over said housing, transmission shafting extending through said housings to drive said road wheels and means coupling said shafting to said change speed gearing.

SYDNEY SMITH.